(12) United States Patent
Choi et al.

(10) Patent No.: US 9,570,110 B2
(45) Date of Patent: Feb. 14, 2017

(54) MULTIMEDIA-DATA-PROCESSING METHOD

(75) Inventors: Byeong Ho Choi, Yongin-si (KR); Yong Hwan Kim, Anyang-si (KR); Hwa Seon Shin, Seongnam-si (KR); Choong Sang Cho, Seongnam-si (KR); Min Seok Park, Seongnam-si (KR)

(73) Assignee: Korea Electronics Technology Institute, Seongnam-si (KR)

( * ) Notice: Subject to any disclaimer, the term of this patent is extended or adjusted under 35 U.S.C. 154(b) by 694 days.

(21) Appl. No.: 13/519,547

(22) PCT Filed: Dec. 24, 2010

(86) PCT No.: PCT/KR2010/009308
§ 371 (c)(1),
(2), (4) Date: Aug. 10, 2012

(87) PCT Pub. No.: WO2011/081367
PCT Pub. Date: Jul. 7, 2011

(65) Prior Publication Data
US 2012/0299929 A1    Nov. 29, 2012

(30) Foreign Application Priority Data

Dec. 28, 2009 (KR) .................. 10-2009-0131600
Jan. 12, 2010 (KR) .................. 10-2010-0002557

(51) Int. Cl.
*G06T 11/20* (2006.01)
*G11B 27/10* (2006.01)

(52) U.S. Cl.
CPC .................... *G11B 27/10* (2013.01)

(58) Field of Classification Search
USPC ........................................ 345/440
See application file for complete search history.

(56) References Cited

U.S. PATENT DOCUMENTS 5,913,038 A * 6/1999 Griffiths ............... 709/231
7,555,540 B2   6/2009 Dunbar et al.
(Continued)

FOREIGN PATENT DOCUMENTS

KR  10-2000-0031566 A   6/2000
KR  10-2000-0315556 A   6/2000
(Continued)

OTHER PUBLICATIONS

Korean Patent Office, Korean Office Action issued in corresponding KR Application No. 10-2009-0131600, dated Mar. 25, 2011.
(Continued)

*Primary Examiner* — Kyle Zhai (57) ABSTRACT

The present invention relates to a multimedia-data-processing method which enables a media graph to always be constructed in a "connection without negotiation" manner, on the basis of an already known media graph construction, and thus provides a media framework in which procedures for connecting components are minimized, thereby improving the performance of a system and satisfying the requests of an OS platform builder and a media application developer. The multimedia-data-processing method of the present invention is performed by a multimedia framework, and comprises: (a) a step of receiving component information required for the construction of the media graph and component connection information from a media application; and (b) a step of ensuring that the media graph is constructed by the content received in step (a), and that the media graph waits for a rendering command, thereby eliminating the necessity of permitting the media application to check the construction of the media graph.

11 Claims, 9 Drawing Sheets

(56) References Cited

U.S. PATENT DOCUMENTS

| | | | |
|---|---|---|---|
| 2004/0267953 | A1 | 12/2004 | Dunbar et al. |
| 2008/0010392 | A1 | 1/2008 | Melpignano |
| 2008/0107170 | A1* | 5/2008 | Ong et al. ................ 375/240.01 |
| 2008/0134012 | A1 | 6/2008 | Kokes et al. |
| 2009/0164655 | A1* | 6/2009 | Pettersson et al. ........... 709/231 |
| 2011/0008012 | A1* | 1/2011 | Kulkarni et al. ............. 386/240 |

FOREIGN PATENT DOCUMENTS

| | | |
|---|---|---|
| KR | 10-2005-0103020 A | 10/2005 |
| KR | 10-2006-0044628 A | 5/2006 |
| KR | 10-2006-0066906 A | 6/2006 |

OTHER PUBLICATIONS

Korean Patent Office, Korean Notice of Allowance issued in corresponding KR Application No. 10-2010-0002557, dated Nov. 8, 2011.

Korean Patent Office, Korean Notice of Allowance issued in corresponding KR Application No. 10-2009-0131600, dated Oct. 21, 2011.

\* cited by examiner

MULTIMEDIA-DATA-PROCESSING METHOD

CROSS REFERENCE TO RELATED APPLICATIONS

This application is a National Stage of International Application No. PCT/KR2010/009308 filed Dec. 24, 2010, claiming priorities based on Korean Patent Application Nos. 10-2009-0131600 filed Dec. 28, 2009 and 10-2010-0002557 filed Jan. 12, 2010, the contents of all of which are incorporated herein by reference in their entirety.

TECHNICAL FIELD

The present invention relates to a multimedia data processing method, and more particularly, to a method of processing multimedia data by a media framework, which enables a media graph to be always constructed in a "connection without negotiation" manner based on an already known media graph construction, thereby minimizing procedures required for component connection.

BACKGROUND ART

Since a mobile (embedded) environment is based on limited resources, technology for a light weight is demanded. Especially, when the mobile environment drives multimedia (hereinafter, simply referred to as "media") including a single audio or video (image) or a combination thereof, a large amount of resources including power is consumed according to a characteristic of the mobile environment. Accordingly, a media framework, which is a fundamental environment, for supporting play, storage, or transmission of a media file, reception of real time Digital Multimedia Broadcasting (DMB), or support of a video conference (hereinafter, such a media processing work is collectively referred to as a "rendering") serves an important role in the mobile (embedded) environment. Herein, a main consumer of the media framework is an Operating System (OS) platform builder or a media application developer, rather than a general end user, and the OS platform builder or the media application developer mainly develops the media application or selects a product based on the media framework.

In the meantime, a conventional media framework was not initiated based on a mobile (embedded) environment, but was developed based on an environment, such as a personal computer, having sufficient resources. Accordingly, generality and flexibility are important factors in enabling the media framework to accept a large number of components, and thus it is difficult to use the conventional media framework in the mobile (embedded) environment due to a significant characteristic, such as resource consumption. Especially, the conventional media framework has a characteristic of supporting other actions, such as a rendering, only after "media graph construction", which means a connection between components necessary for rendering specific media, is completed. Here, the "component" refers to an independently functioning computer program for processing a media data stream, and each component may selectively have one or more input ports and output ports. The "media graph" refers to a set of one or more components added or connected for processing a media data stream.

Figure 1:
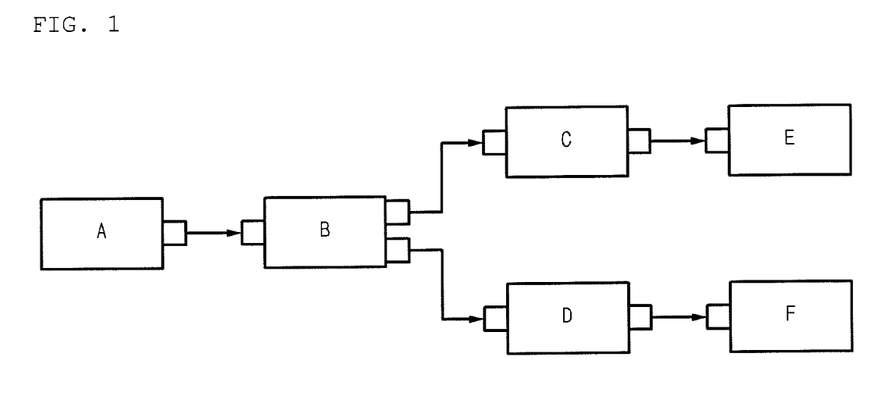
FIG. 1 is a media graph for exemplarily illustrating a disadvantage of a conventional media framework.

FIG. 1 is a media graph for exemplarily illustrating a disadvantage of the conventional media framework.

As illustrated in FIG. 1, according to the conventional media framework, when the media graph includes six components, A, B, C, D, E, and F, the conventional media framework may execute the rendering after completely performing the connection between the components. When the conventional media framework performs the connection between the components, it performs a negotiation process in order to conform to a data type or a data buffer of media. For example, there are n data types for component A and m data types for component B, a total of n×m data type-related negotiations may be generated. An additional negotiation is progressed in order to conform to a size (horizontal and vertical sizes), a stride, etc., in a case of a video, in addition to the data type. Further, even though the conformation to the data type is completed, the connection is completed only after the negotiation for determining data buffer is progressed. Such a process is required for every component, so that the process is required for each of all 5 connections between the 6 components in the present example. Further, there may be a case in which the connection between the components in an uplink side (left side) is required again according to a characteristic of the connection between the components in a downlink side (right side) depending on cases.

Such a complex connection process is implemented with a processing and the consumption of resources, such as power, in the mobile (embedded) environment. There are some representative products of the conventional media framework technology, such as DirectShow of Microsoft Corporation and GStreamer based on an open source.

As described above, when the conventional media framework technology is applied to the mobile (embedded) environment, a plurality of negotiation processes are required to be repeated in the connection process for the media graph construction, so that the media graph construction becomes slow and resources including power are consumed.

In addition, since a media application (developer) is responsible for the media graph construction based on the conventional media framework, the application is required to check whether the media graph is properly constructed and whether an error is generated in the process of the media graph construction. Accordingly, the media application bears the burden of continuous monitoring of the media graph construction. As a result, the connection process has a problem in the unnecessary consumption of resources due to an unnecessary processing change, etc. in the mobile (embedded) environment, as well as the burden on the application developer.

Since a relevant hardware, such as a video decoder chip or an audio decoder chip, has been already determined in the mobile (embedded) environment, an OS platform builder may provide a preset such that the media graph may be constructed in accordance with a situation where the hardware has been already determined, and the media application selects the preset and demands the media graph construction. However, the conventional media framework technology cannot support the prompt connection.

Hereinafter, the problem of the conventional media framework technology will be described in detail by giving specific examples of Territorial-Digital Multimedia Broadcasting (T-DMB) reception and MPG file play.

Figure 2:
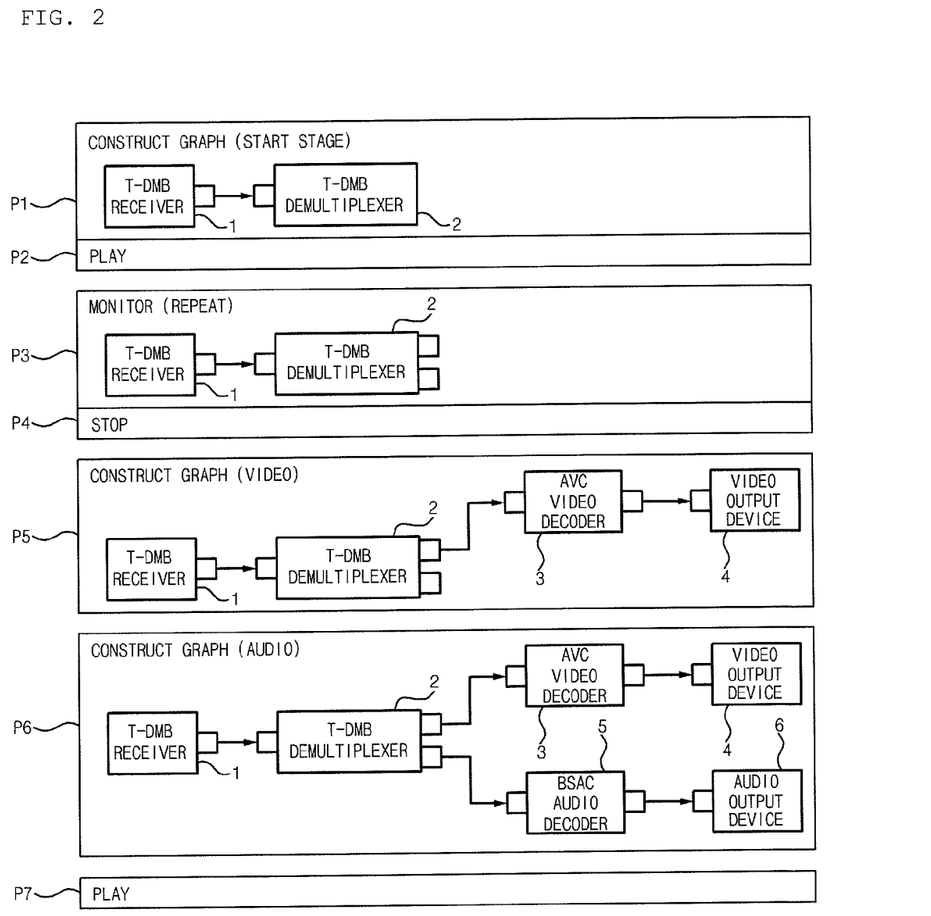
FIG. 2 is a diagram illustrating a process of the media graph construction for reception of a T-DMB in the conventional media framework.

FIG. 2 is a diagram illustrating a process of the media graph construction for reception of the T-DMB in the conventional media framework. As illustrated in FIG. 2, in order for the conventional framework to receive the T-DMB, a T-DMB receiver component 1 and a T-DMB demultiplexer component 2 are added and connected to each other in the first procedure P1, and a media type negotiation process and a buffer negotiation process are repetitively performed in every connection process. Since the broadcasting is not received from the T-DMB receiver component 1 before a play of the second procedure P2, the T-DMB demultiplexer component 2 cannot determine an output port (even though the output ports has been configured, the output port is in a connection disabled state). Accordingly, through the performance of the play of the second procedure P2, the T-DMB receiver component 1 receives T-DMB broadcasting data and transfers the T-DMB broadcasting data to the T-DMB demultiplexer component 2.

Then, the media application is required to repetitively monitor whether the T-DMB demultiplexer component 2 succeeds the analysis of the T-DMB broadcasting and generates the output port. However, such a repetitive monitoring is considered as a burden on the media application. Further, in this process, if the output port is not configured even after a predetermined time, the media application is required to perform an error processing. In this case, the media application is required to determine a duration required for the monitoring and the number of generated output ports required for the determination of the media graph construction as the success (a case where only the video output port is generated but the audio output port is not generated or the contrary, etc.—since the reception of the data in the wireless broadcasting is unstable, the media application is properly operated when a radio wave is strong, but the media application is not properly operated when the radio wave is unstable). Accordingly, the existing media framework has a problem of "shifting the responsibility of the media graph construction onto the media application".

Referring to FIG. 2 again, when the output port of the T-DMB demultiplexer component 2 is normally generated, the media application performs a stop operation in the fourth procedure P4 in order to complete the media graph for a corresponding output port because "manipulation of the media graph is generally restricted during the play in the conventional framework technology". Next, a media graph related to the video output is completed by sequentially connecting an AVC (Advanced Video Coding: MPEG-4 AVC/H.264 video codec standard) video decoder component 3 and a video output unit component 4 to the video output port of the T-DMB demultiplexer component 2 in the fifth procedure P5 after the stop operation. Then, a media graph related to the audio output is completed by sequentially connecting a BSAC (Bit-Sliced Arithmetic Coding: the audio codec standard used for the T-DMB) audio decoder component 5 and an audio output unit component 6 to the audio output port of the T-DMB demultiplexer component 2 in the sixth procedure P6.

When the desired media graph is completed through the aforementioned procedures, the media application performs a play in the seventh procedure P7 so that a user may watch the video and audio of the T-DMB broadcasting. As such, the media application is required to check in detail every procedure and whether an error is generated up to the completion of the media graph and the performance of the play operation. In the present example, a disconnection may be generated during the five procedures for the connection between the respective components, and especially it is necessary to consider even a case requiring the continuous monitoring of the generation of the output port of the third procedure P3 in a situation, such as broadcasting, where the reception strength is changed. Accordingly, the media application has a large burden in the conventional media framework and its burden further increases in the mobile (embedded) environment.

Figure 3:
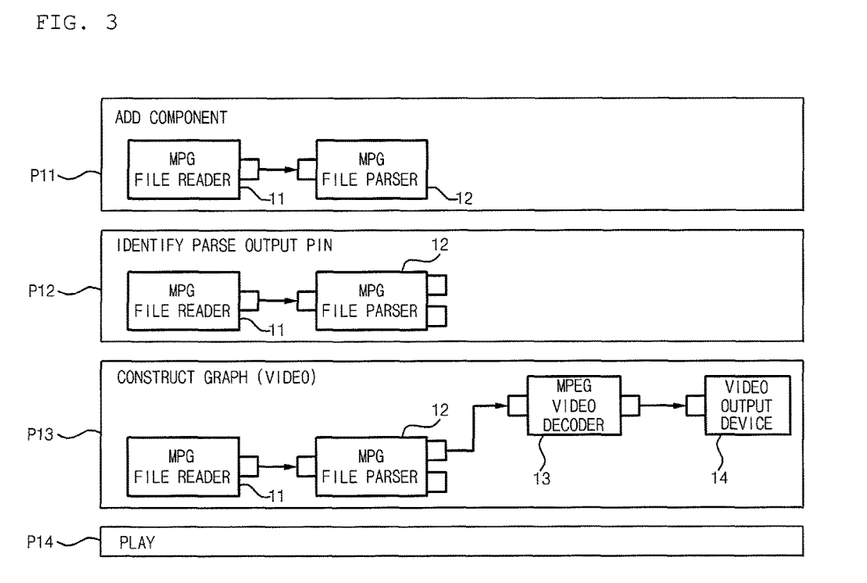
FIG. 3 is a diagram illustrating a process of the media graph construction for play of an MPG file in the conventional media framework.

FIG. 3 is a diagram illustrating a process of the media graph construction for play of an MPG (MPEG: Motion Picture Expert Group) file in the conventional media framework. As illustrated in FIG. 3, for the play of the MPG file in the conventional media framework, an MPG file reader component 11 for reading data from the MPG file and an MPG file parser component 12 for analyzing the MPG file are added in the first procedure P11. Here, the MPG file parser component 12 is in a state of failing to determine an output port because it has not yet received the data.

Next, when the MPG file reader component 11 and the MPG file parser component 12 are connected in the second procedure P12, the MPG file reader component 11 reads partial data of the file and transfers the read data to the MPG file parser component 12 in the connection process, and the MPG file parser component 12 generates an output port according to contents of the analyzed data. Here, since the MPG file is a local file, the MPG file reader component 11 directly reads the data from the MPG file and provides the read data to the MPG file parser component 12 in the connection process contrary to a case of the broadcasting. However, when the data is not provided, the media application is required to perform the "play" operation, stop the play after a short time, and then construct the media graph for the output port as illustrated in the example of the T-DMB broadcasting. The present example is based on a situation where the video output port is generated because there is no audio data or there is an error in the MPG file. In this case, the media graph for the video output is completed by sequentially connecting an MPG video decoder component 13 and a video output unit component 14 in the third procedure P13.

Here, the media application is required to determine whether to process failure of the construction of the media graph for the audio as an error or a normal situation. When the failure of the construction of the media graph is processed as a success (normal) situation, the media application performs the play operation and outputs the video on a screen.

In this process, since the media graph for the audio is not completed, the media application is required to recognize the non-completion of the media graph for the audio and conduct a processing such that a configuration related to the audio is not made. In this case, it is necessary to additionally consider a processing of a user interface related to the audio, as well as a configuration of hardware related to the audio. As described above, the media application bears a burden of checking a result of the media graph construction and performing a relevant processing in the conventional media framework. Contrary to this, when only the media graph for the audio is constructed, but the media graph for the video is not constructed, the relevant processing becomes more complex. That is, since there is no video, the media application is required to fill a specific area with the screen, adjust its size, or the like, thereby having an increased burden.

DETAILED DESCRIPTION OF THE INVENTION

Technical Problem

Accordingly, the present invention has been made to solve the above-mentioned problems occurring in the prior art, and the present invention provides a method of processing multimedia data by a media framework, which enables a media graph to be always constructed in a "connection without negotiation" manner based on an already known media graph construction, thereby minimizing procedures required for component connection, and in which a connection denial incapability component included in the media graph may rapidly and efficiently determine a possibility of the data reception, thereby improving a performance of a system and satisfying demands of an OS platform builder and a media application developer.

Technical Solution

In accordance with an aspect of the present invention, there is provided a method of processing multimedia data by a multimedia framework, which allows a media application to omit checking of a construction of a media graph, the method including the steps of: (a) receiving information on a component required for construction of a media graph and connection information on the component from the media application; and (b) ensuring that the media graph is constructed according to contents received in the step of (a) and that the media graph waits for a rendering command.

In the step of (a), the information on the component and the connection information on the component are received through preset file information containing the information on the component and the connection information on the component.

In the meantime, the component includes a connection denial capability component, which is capable of denying a connection and a connection denial incapability component, which is incapable of denying a connection, and the media framework notifies the connection denial incapability component of only information on a component to be connected in a back side, but intervenes in a connection between a front component and a back component for the connection denial capability component.

When the connection denial incapability component performs the rendering, the connection denial incapability component identifies data received through an input port and outputs the data through an output port after processing the data when the received data is processible data, but does not receive the data and makes the data flow when the received data is not processible data.

The flown data is transferred to the multimedia framework or another component designated by the multimedia framework.

When the multimedia framework receives the flown data, the multimedia framework notifies the media application of the reception of the received data.

One or more components included in the media graph are allowed to be changed or replaced during the performance of the rendering.

The component includes a connection denial incapability component, and the connection denial incapability component pre-stores alignment unit information on data processible by the connection denial incapability component, and compares the pre-stored alignment unit information with alignment unit information included in a header of the input data, and receives the data when the pre-stored alignment unit information corresponds to the alignment unit information included in the header of the input data, but denies the reception of the data and makes the data flow when the pre-stored alignment unit information does not correspond to the alignment unit information included in the header of the input data.

In the aforementioned construction, the connection denial incapability component outputs the data by adding alignment unit information on the corresponding data to a header of the data processed by itself.

In the meantime, the connection denial incapability component outputs the data by adding type information and alignment unit information on the corresponding data to a header of the data, pre-stores the type information and the alignment unit information on the data processible by itself, and receives the data when all of the type information and the alignment unit information included in the header of the input data correspond to the pre-stored type information and alignment unit information, but denies the reception of the data and makes the data flow when any one of the type information and the alignment unit information included in the header of the input data does not correspond to the pre-stored type information and alignment unit information.

The flown data is transferred to the multimedia framework or another component designated by the multimedia framework.

When the multimedia framework receives the flown data, the multimedia framework notifies the media application of the reception of the received data.

One or more components included in the media graph are allowed to be changed or replaced during the performance of the rendering.

Effect of the Invention

Accordingly, the method of processing the multimedia data of the present invention is designed to be compatible with the mobile (embedded) environment to perform only a minimum connection procedure, so that the media graph construction is fast, and the consumption of resources, such as power, is reduced because the process of the entire search or the connection negotiation is not performed. Further, the media graph may be verified and rapidly constructed through the GUI editor, etc., so that the present invention is compatible with the application and improves the stability of the media application by reducing latent errors.

Furthermore, the method of processing the multimedia data of the present invention may resolve a customer's demand which the conventional media framework failed to resolve. That is, a dissatisfaction of "I wish it would just connect but there are many steps!" of the OS platform builder is resolved by directly constructing the media graph stipulated through the preset, etc. by the media framework. Further, the burden on the media application may be resolved by shifting the responsibility of the media graph construction, i.e. a question of the media application developer of "Why is the media application necessarily involved in the media graph construction in detail", onto the media framework. Accordingly, the convenience of development of the media framework is increased and the technology competitiveness is enhanced.

As described above, since the method of processing the multimedia data of the present invention is conceived considering the mobile (embedded) environment, the present invention may provide the service optimized to the mobile (embedded) environment. Further, since the present invention may selectively employ the entire search function of the conventional media framework, the present invention may smoothly handle even a situation having abundant resources, such as a PC environment.

Furthermore, a component incapable of denying the reception included in the media graph is able to rapidly and efficiently determine a possibility of reception of data inputted through its input port, so that the present invention may improve the efficiency of the media graph.

MODE FOR CARRYING OUT THE INVENTION

Hereinafter, exemplary embodiments of a method of processing multimedia data of the present invention will be described with reference to the accompanying drawings.

The method of processing the multimedia data of the present invention provides a media framework engine optimum to a mobile (embedded) environment, thereby minimizing procedures necessary for a connection in media graph construction. That is, a media framework according to the present invention supports a performance in a "direct connection" manner, i.e. "connection without negotiation" based on an already known media graph construction. For example, a conventional media framework performs a connection process in every connection of components for the media graph construction of FIG. 1 and failure may be generated in the connection processes. However, the media framework of the present invention does not generate failure in a connection process, thereby always ensuring a transferred media graph construction.

That is, the media framework of the present invention performs a minimum operation, such as transference of information on a component in a back side to a component in a front side. The component receiving the information is later connected with the component in the back side without any negotiation, so that the media graph is constructed. Hereinafter, a component operated in the aforementioned manner, i.e. a component conforming to the media framework of the present invention is referred to as a "connection denial incapability component (which is incapable of denying a connection)". On the contrary, a component conforming to the conventional media framework, i.e. a component in a front side for constructing a media graph by directly performing a negotiation with a component in a back side (and denying the connection when the negotiation is failed as a result of the negotiation) is referred to as a "connection denial capability component (which is capable of denying a connection)". Further, in a case in which it is necessary to dispose a connection denial capability component in a back side to be described later so as to accept up to the connection denial incapability component, the media framework of the present invention ensures the media graph construction without failure by a manner of intervening in the connection between the component in the front side and the component in the back side.

In the meantime, an OS platform builder may build a basic preset based on the aforementioned characteristic and provide the media application with the built preset. Here, the "preset" refers to a computer readable medium including information, e.g. component information and connection information on component, necessary for construction of a specific media graph such that predetermined media may be rendered. Such a preset may be built in advance and distributed by an OS platform builder or may be built in advance and distributed together with a media application by a media application user. In addition, a user may use the preset by directly and manually writing the preset, and may write the preset through a tool, such as a Graphic User interface (GUI) editor.

Further, the preset may be data transferred through a network or a memory dynamically generated through an internal logic, not a file. The media frame work may accept both the preset in a form of a file and the preset in a form of a memory buffer.

However, the media application may direct every piece of connection information without use of the preset to the media framework. An example of the preset according to the present invention includes a T-DMB preset, an MPG preset, an H.264 preset, a DVD preset, an MP3 preset, or an AAC preset.

The connection information basically means basic information necessary for performing a connection between components, and generally designates an output port and an input port of a specific component to be connected. Depending on occasions, the connection information may include information for designating only two components and performing up to an implied connection between the two components.

Further, since the media framework of the present invention does not fail the media graph construction and also directly manages the media graph construction, the media application may become free from the burden of the media graph construction borne by the conventional media application and perform a "data-based" operation rather than a "media graph-based" operation.

Figure 4:
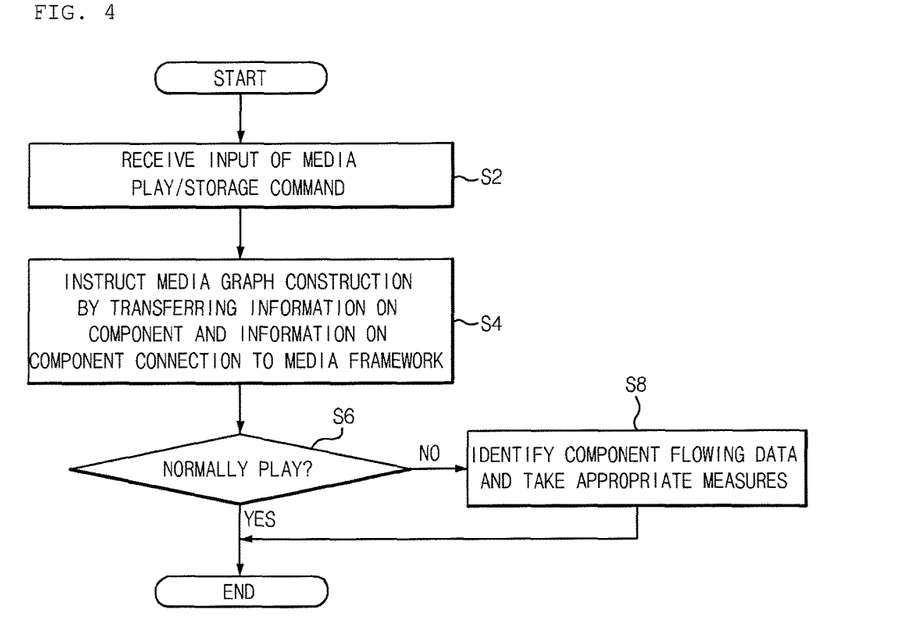
FIG. 4 is a flowchart illustrating an operation of a media application in a method of processing multimedia data of the present invention.

FIG. 4 is a flowchart illustrating an operation of the media application in the method of processing the multimedia data of the present invention. The media framework of the present invention ensures the media graph construction by directly connecting a component according to a direction of the media application without a negotiation for a data type or a buffer. To this end, as illustrated in FIG. 4, the media application may recognize a type of media, which a user desires to render, based on a command input from the user (step S2) and direct construction of a media graph to the media framework after determining a component appropriate for the rendering of the media in the corresponding type and a connection relation of the components (step S4). Further, when there is a preset file containing information on the corresponding component and information on the connection relation of the component, the media application simply notifies the media framework of only information on the preset file. Then, the media framework constructs the media graph according to contents stored in the preset file.

Next, the media application determines whether the rendering is normal by receiving information about a normal rendering from the media framework (Step S6). When the media is normally rendered, the media application stops a corresponding routine. However, when the media is abnormally rendered, the media application identifies a component transferring data from the media framework and performs appropriate measures (step S8).

Figure 5:
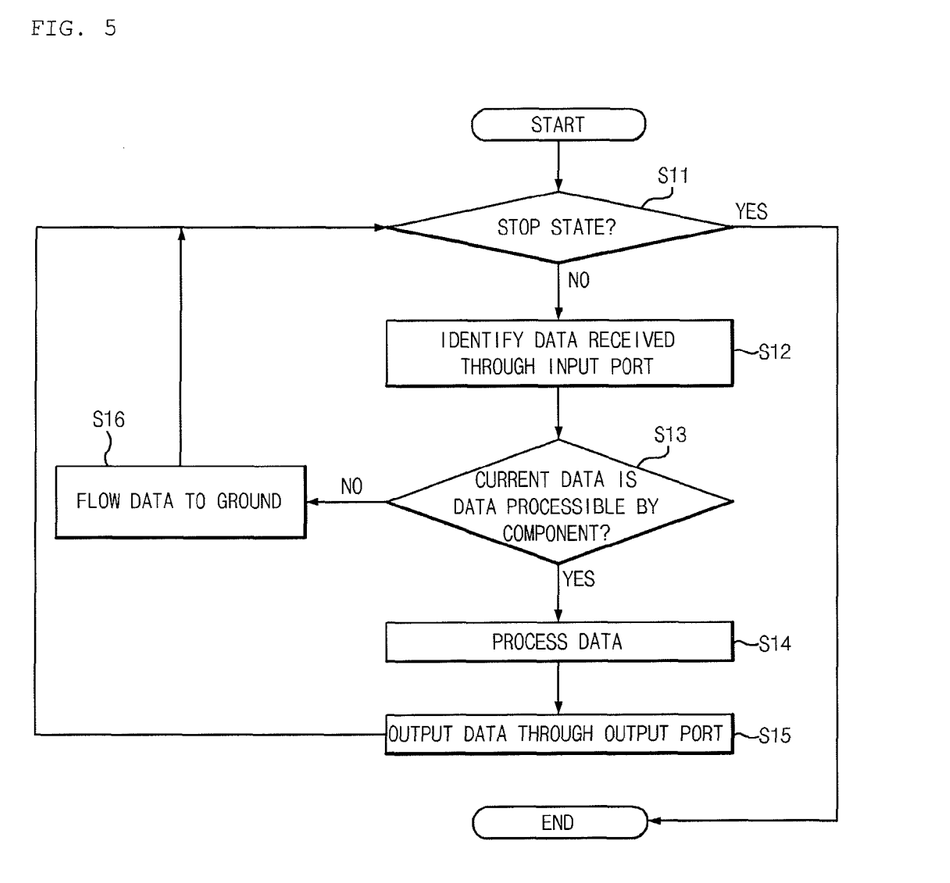
FIG. 5 is a flowchart illustrating an operation of data transmission/reception by respective components of a multimedia framework in a method of processing multimedia data of the present invention.

FIG. 5 is a flowchart illustrating an operation of data transmission/reception in respective components of the multimedia framework in the method of processing the multimedia data of the present invention, and illustrates an example of an operation of a component having both an input port and an output port. As illustrated in FIG. 5, the multimedia framework checks if a predetermined component included in the media graph checks is in a state of stopping a data processing in step S11. When the predetermined component is in the state of stopping the data processing as a result of the checking in step S11, the predetermined component stops the corresponding routine. However, when the predetermined component is not in the state of stopping the data processing, the predetermined component identifies data, e.g. a mark or a sync bit of a header, received through the input port in steps S12 and determines a possibility of processing of corresponding data in step S13. When the corresponding data is processible data as a result of the determination of step S13, the predetermined component receives the data and performs a processing, which is responsible for, on the received data in step S14 and outputs the processed data through the output port in step S15. It is not necessary for the corresponding component to separately recognize the operation of outputting the data through the output port. However, when the corresponding data is not processible data as a result of the determination of step S13, the predetermined component proceeds to step S16 of not receiving inputted data. Accordingly, the data flows to the bottom. The data dumped to the bottom is transferred to the media framework functioning as a discharge port or to another component designated by the media framework.

Step S11 of checking the normal state of the component in FIG. 5 is a general matter. Here, it may be identified that the predetermined component may perform a continuous operation of denying the data reception due to the reception of the abnormal data at a specific moment and then receiving the data again when the normal data is input.

Figure 6:
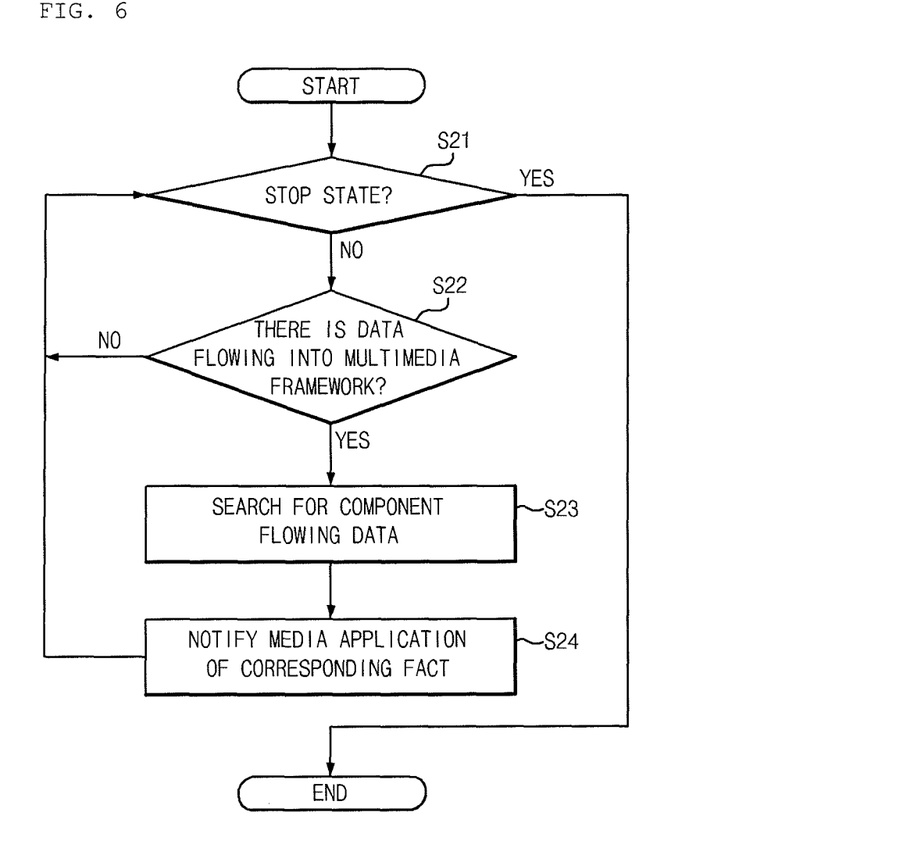
FIG. 6 is a flowchart illustrating data detection by a multimedia framework in a method of processing multimedia data of the present invention.

FIG. 6 is a flowchart illustrating data detection by the multimedia framework in the method of processing the multimedia data of the present invention. As illustrated in FIG. 6, the media framework checks whether a predetermined component included in the media graph is in a state of stopping a data processing in step S21. When the predetermined component is in the state of stopping the data processing as a result of the checking in step S21, the media framework stops a corresponding routine. However, when the predetermined component is not in the state of stopping the data processing as a result of the checking in step S21, the media framework proceeds to step S22 of determining whether there is data flowing into the media framework in step S22. When there is no data flowing into the media framework as a result of the determination in step S22, the media framework returns to step S21. However, when there is data flowing into the media framework as a result of the determination in step S22, the media framework sequentially identifies the component outputting the corresponding data in step S23 and notifies the media framework of information on the identified component in step S24. Step S21 of checking whether the predetermined component is in the state of stopping the data processing in FIG. 6 is a general matter. Further, in FIG. 6, the data naturally flows according to a connection circumstance of the component, so that it is general that the media framework does not involve the connection in detail, but, in another case, may involve in the connection in detail.

Figure 7:
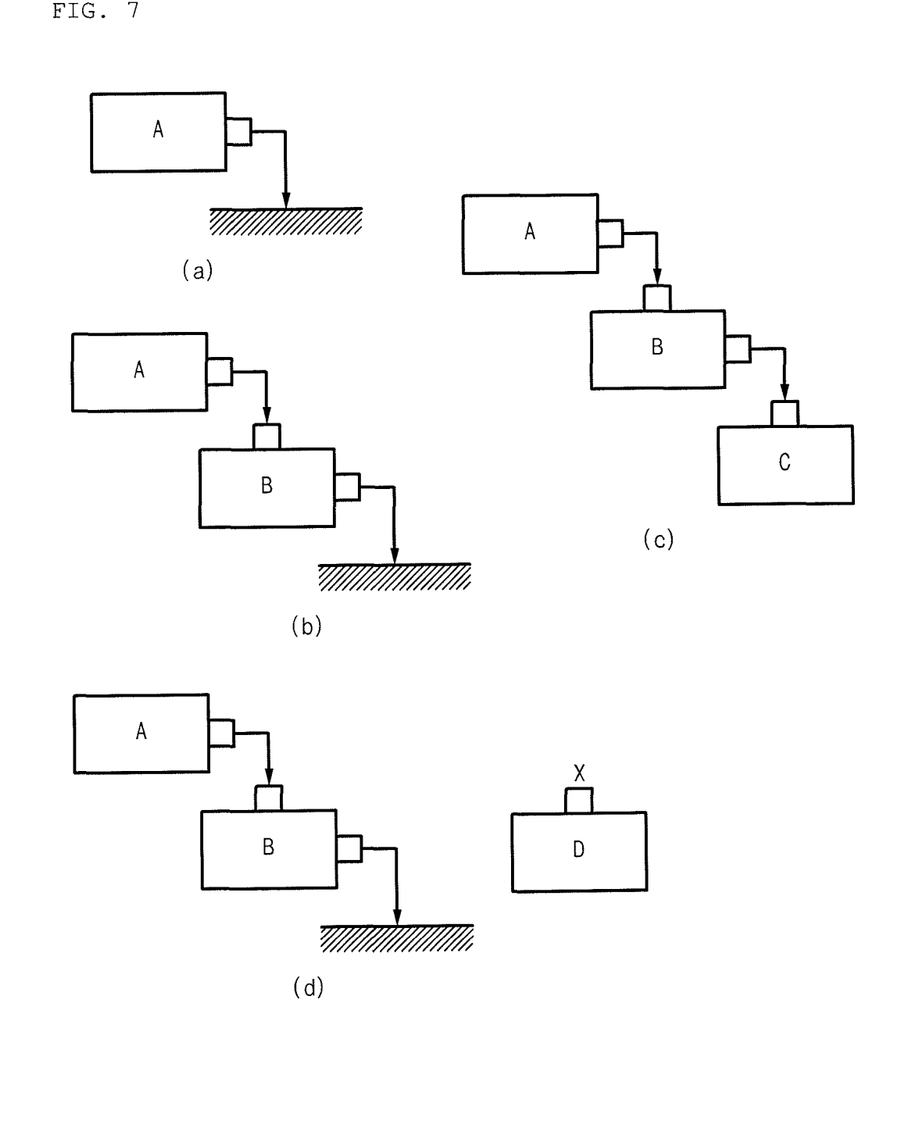
FIGS. 7A to 7D are diagrams illustrating an operation of a multimedia framework according to the present invention.

FIGS. 7A to 7D are diagrams illustrating an operation of the multimedia framework according to the present invention, and illustrate an operation of a connection denial incapability component. As illustrated in FIG. 7, the media frame according to the present invention configures "a basic environment operated even when a component is not connected". Basically, the environment illustrated in FIG. 7A provides the media framework. That is, as illustrated in FIG. 7A, an output of component A is not connected to another component, but it may perform play. Here, when it is assumed that the output of component A is water, it may be expressed that the discharged water drops to the ground or a drain. In this case, the water means the data and the ground or the drain means the media framework. Based on the aforementioned technology, the media framework implements the "environment operated even when a component is not connected". To extensively describe this, as illustrated in FIG. 7B, data flown from component A may be input to component B, and component B outputs the input data through its output port after processing the input data.

Next, when there is no other component receiving the outputted data, the outputted data directly flows into the media framework. However, when there is a component receiving the outputted data and consuming the received data, component C receives the outputted data from component B and consumes all the received data as illustrated in FIG. 7C. In this case, since component C consumes all the data, there is no data flowing into the media framework. However, as illustrated in FIG. 7D, when another component D denies (denies the connection, not the reception) the output of component B, the output of component B directly flows into the media framework. Since the present invention is based on the aforementioned concept, an error related to the media graph construction is not generated, and whether to succeed a relevant operation may be determined according to a rendering state, i.e. a success of the data flow.

The media framework of the present invention may recognize the relevant operation and appropriately notify the application using the media framework of the recognized operation. Further, the component within the media framework is required to include technology for "determining whether the data is received" in order to perform the aforementioned process.

Figure 8:
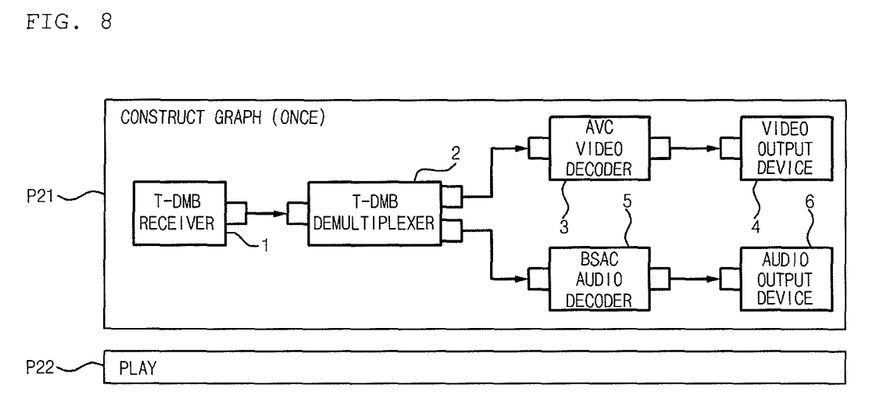
FIG. 8 is a diagram illustrating a process of media graph construction in order to receive the T-DMB broadcasting in a multimedia framework according to the present invention.

FIG. 8 is a diagram illustrating a process of the media graph construction in order to receive the T-DMB broadcasting in the multimedia framework according to the present invention. As illustrated in FIG. 8, the media framework according to the present invention constructs the media graph requested from the media application once in the first procedure P21. That is the media framework of the present invention is characterized in that "the media framework ensures the media graph construction without an error in the process of the media graph construction". Accordingly, contrary to the conventional media framework, the responsibility of the media graph construction is transferred onto the media framework, not the media application, and thus the burden borne by the media application is greatly reduced.

Further, contrary to the conventional media framework repeating the media type negotiation and the buffer negotiation in making the connection between the components (i.e. the connection denial capability components), the media framework of the present invention performs a minimum operation, such as transference of information on a back-side component to be connected to a front-side component. However, the media framework of the present invention may have an operation required for driving of the connection denial capability component which is also operated in the conventional media framework because the media framework is required to accept even a conventional component.

In the meantime, because the completion of the media graph construction is always ensured, the media application directly performs a play command in the second procedure P22. A waiting or monitoring process is not necessary in the first and second procedures P21 and P22. As described above, according to the media framework of the present invention, a procedure up to the play is rapid compared to that of the conventional framework and even a problem of the screen freezing may be removed.

Further, when a reception sensibility or a degree of an error of received data is changed according to strength of a radio wave like the T-DMB broadcasting, the smooth play of the broadcasting and the non-smooth play of the broadcasting may be repeated. When the broadcasting reception state is bad, a situation where the media graph is never constructed develops in the conventional media framework. However, the media framework of the present invention simply repeats the play of the broadcasting and the interruption of the broadcasting. Accordingly, the media framework of the present invention has advantages of not only greatly reducing the power consumption due to the continuous repeating of the media graph construction when the reception state is bad in the mobile (embedded) environment, but enhancing stability of the media application and designing a user interface (UI) in a preferred direction.

Figure 9:
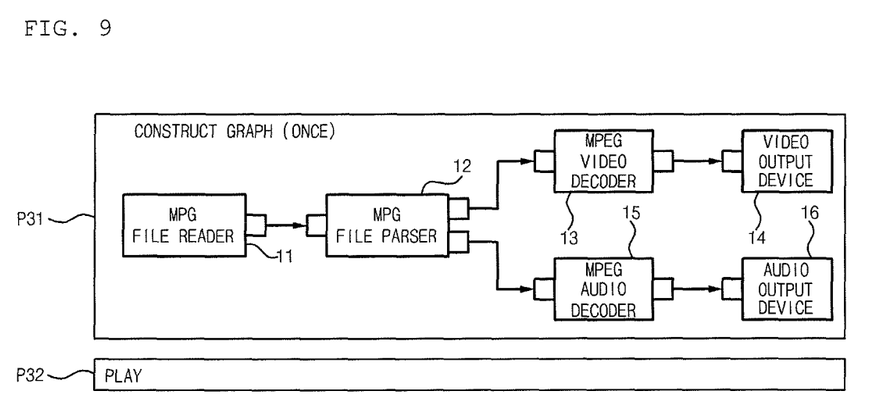
FIG. 9 is a diagram illustrating a process of media graph construction for play of an MPG file in a multimedia framework according to the present invention.

FIG. 9 is a diagram illustrating a process of the media graph construction for play of an MPG file in the multimedia framework according to the present invention. As illustrated in FIG. 9, the media framework of the present invention constructs the media graph requested by the media application once in the first procedure (P31). That is, it is ensured that the media framework of the present invention constructs the media graph without an error in the process of the media graph construction. Accordingly, the media application may directly perform the configuration in relation to a video and an audio without a necessity of worrying about whether the media graph construction is succeeded, and may process the play of the video and the audio by performing the play in the second procedure (P32).

In the present embodiment, it is assumed that the MPG file actually has no audio data or has an error. Contrary to the conventional media framework making a reaction while being aware that the media application has a problem in the media graph construction, the media application may receive a notification of the relevant situation after the play from the media framework in the present invention. That is, the media application is notified of contents that only the audio is not played due to the problem of the audio data, but there is no other problem. Accordingly, the media application is sufficient to process an appropriate operation corresponding to only the audio problem. There is generally no item to be significantly processed for the situation in which the audio is not played, and since a sound output device component has been added, there is no case generating a significant problem in the configuration related to sound card hardware. Contrary to this, when the video data has a problem, only sound is played, but the screen is not displayed, and the video output device may display a basic screen (commonly a black screen). Because such a situation is also notified of to the media application, the media application may perform an operation, such as outputting a company logo on the screen or adjusting a window size of the application, depending on a necessity of the media application. Here, it is required to take note of the matter that because the media graph in the video side is not constructed in the conventional media framework, the video output device component may not be constructed in the media graph and a relevant screen configuration may not be progressed, so that the media application has been essentially required to take relevant measures.

Contrary to this, since the media framework of the present invention completes the media graph construction regardless of the data and also includes the video output device component, the media framework outputs a basic environment when there is no problem in the screen configuration and there is simply no video data. Thus, the media application is not necessary to perform a specific processing and simply performs the specific processing selectively. As described above, according to the media framework of the present invention, a burden borne by the media application is greatly reduced.

In this aspect, the conventional media framework has a structure of performing the processing based on the media graph and forcing the media application to take the responsibility of the media graph construction, but the media framework of the present invention removes the burden of the media graph construction borne by the media application and achieves a shift to a paradigm of performing the processing based on the data.

In the meantime, in order to rapidly designate the media graph, the present invention may pre-write and store the preset. To this end, the present invention may utilize the GUI editor. The GUI editor may perform a connection validation, as well as the media graph construction. Further, the media graph may be rapidly constructed without an error based on the stored preset in the media framework of the present invention. Further, the operation through the GUI improves the stability and provides a developer with a more convenient method, compared to the conventional operation of constructing and validating the media graph through a program source code.

Figure 10:
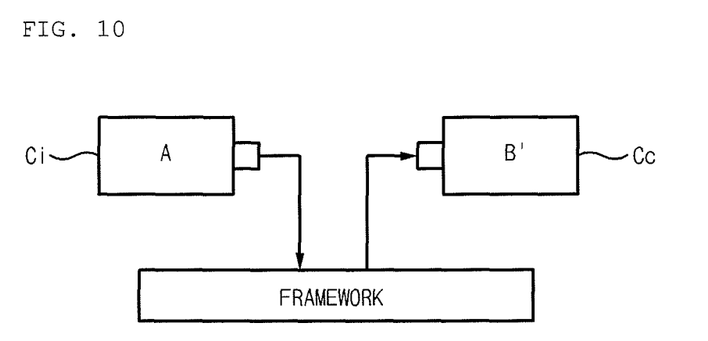
FIG. 10 is a diagram illustrating a process of intervening in the connection between a connection denial incapability component and a connection denial capability component by a multimedia framework according to the present invention.

FIG. 10 is a diagram illustrating a process of intervening in the connection between a connection denial incapability component and a connection denial capability component by the multimedia framework according to the present invention. As illustrated in FIG. 10, a component, i.e, a connection denial incapability component Ci, in accordance with the media framework of the present invention is positioned in a front side and a component, a connection denial capability component Cc, in accordance with the conventional media framework is located in a back side in a process of the media graph construction, it is impossible to construct the media graph led by the connection denial capability component. Accordingly, in this case, the media framework of the present invention identifies the media graph construction based on an already known media graph construction and then intervenes in the connection between both components, thereby completing the media graph construction without failure. That is, the media framework completes the media graph construction by receiving the data outputted and flown from the connection denial incapability component Ci in the front side and transferring the received data to the connection denial capability component Cc in the back side.

Figure 11:
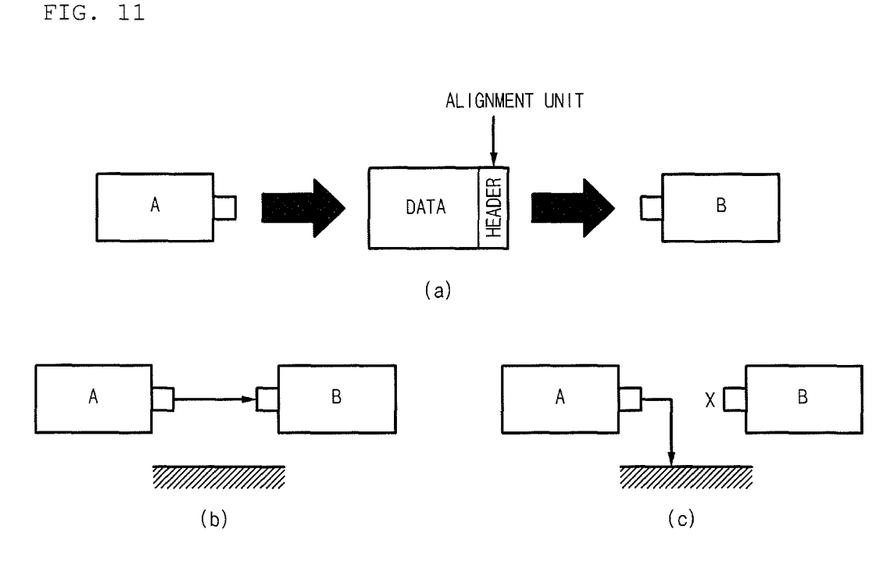
FIGS. 11A to 11C are diagrams illustrating a method of receiving or denying data from a component in a front side by a connection denial incapability component in a method of processing multimedia data according to the present invention.

FIGS. 11A to 11C are diagrams illustrating a method of receiving or denying data from a front side component by a connection denial incapability component in the method of processing the multimedia data according to the present invention. As described above, in the method of processing the multimedia data of the present invention, the connection denial incapability component determines whether it is possible to receive data input through the input port, and when it is possible to receive the data, the connection denial incapability component receives and processes the data, however, when it is impossible to receive the data, the connection denial incapability component may denying the reception of the data, for example, receive or denying the reception of the data transmitted(outputted) from the component in the front side.

To this end, each component has a characteristic of recognizing an acceptable alignment unit. Referring to FIGS. 11A to 11C, a header is generally included in a head of data transmitted through an output port of component A in the front side as illustrated in FIG. 11A. The header directly notifies information (hereinafter, referred to as "type information") indicating a type of corresponding data and a size (in a case of a video, a horizontal size and a vertical size) or include information (hereinafter, referred to as "alignment unit information") based on which type information and size may be calculated. To this end, the output port of component A outputs data by adding the header in the head of the data for each alignment unit of the data processed by itself or identifying every alignment unit (when the header is not necessary or the header has been already added to existing data).

Accordingly, an input port of component B receiving the input of the data reads the type information and the alignment unit information on the data from the header of the input data, determines whether the data is data processible by component B, and then determines a possibility of reception of the data. For example, as a result of an analysis of the information included in the header, when the data is a type of data processible by component B and the alignment unit is the same as that of component B, component B receives the data as illustrated in FIG. 11B. However, the data is not a type of data processible by component B and the alignment unit is not the same as that of component B, component B denies the reception of the data as illustrated in FIG. 11C. The reception denied data is thrown into the drain designated by the media framework as described above. Such a process is repeated for every alignment unit of the data, and the alignment unit may be changed according to the type of data.

It is a matter of course that the header of each data may include only the alignment unit information, and a position of the header of the data may be designated as a position which is not the head of the data depending on a characteristic of the data.

FIGS. 12A to 12D are diagrams illustrating, based on an example of the media graph for the play of the MPG file of FIG. 9, a process of determining whether a connection denial incapability component is able to receive data in the method of processing the multimedia data according to the present invention.

Figure 12:
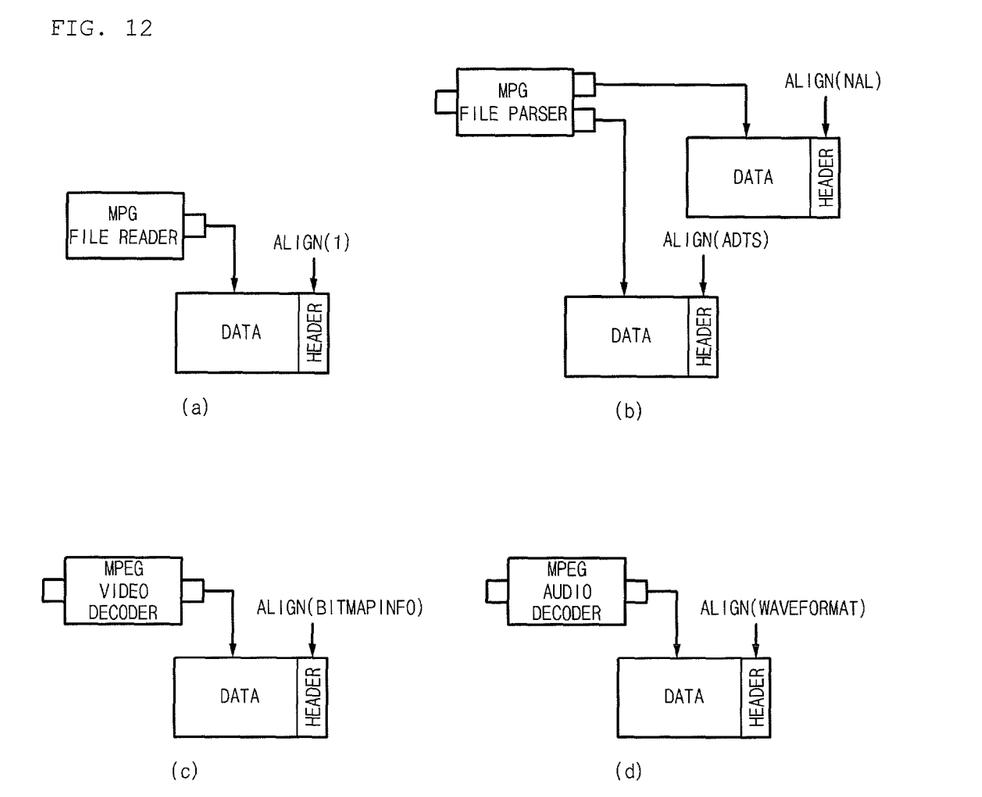
FIGS. 12A to 12D are diagrams illustrating, based on an example of a media graph for play of the MPG file of FIG. 9, a process of determining whether a connection denial incapability component is able to receive data in a method of processing multimedia data according to the present invention.

First, as illustrated in FIG. 12A, an MPG file reader positioned in the front-most side of the media graph serves to simply read a bitstream and output the read bitstream through the output port while failing to recognize a type or a characteristic of a file due to its function. Accordingly, the alignment unit is a unit of a byte, i.e. "1", and does not include the header. Next, as illustrated in FIG. 12B, an MPG file parser that is a component connected in the back side receives and analyzes the bitstream transferred by the MPG file reader, separates the data into a video bitstream and an audio bitstream according to a result of the analysis, adds a header including type information and alignment unit information on the corresponding data to an appropriate position, e.g. a head, of the data, and outputs the data.

In this case, for example, the alignment unit in a case of the video may include an alignment unit of the NAL under the AVC/H.264 video standard, and the alignment unit in a case of the audio may include an alignment unit of the Audio Data Transport Stream (ADTS) under the Advanced Audio Coding (AAC) audio standard.

Next, as illustrated in FIG. 12C, an MPEG video decoder that is a component positioned in the back side of the MPG file parser receives the data having the NAL alignment unit output from the front-side MPG file parser, processes the received data into bitmap image data, adds the header including the type and the alignment unit information on the data to an appropriate place, e.g. the head, of the data, and outputs the data, for example, adds a BITMAPINFO alignment unit, i.e. the alignment unit of a still image (bitmap) to the head of the data and outputs the data in a case of the video. Next, the video output device receiving the data outputs the still image on the screen in accordance with its timing.

In the meantime, as illustrated in FIG. 12D, an MPEG audio decoder positioned in the back side of the MPG file parser receives and processes the data in the ADTS alignment units transferred from the front-side MPG file parser, adds information on a type and an alignment unit, e.g. a WAVEFORMAT alignment unit, i.e. a Pulse code Modulation (PCM) audio unit, on the data in an appropriate place, e.g. a head, of the data, and outputs the data. The audio output device receiving the data outputs the PCM audio through a sound device in accordance with its timing.

As described above, contrary to the conventional media framework, according to the present invention, the header added for every alignment unit of the data outputted from each component includes the type information and the alignment unit information on the data. Accordingly, even though a predetermined component is dynamically changed or replaced during the process of the play, the changed or replaced component may process the data by analyzing the data and processing the data when the data is processible by the changed or replaced component. In this process, the data is flown into the media framework at a moment of removing the component and the data may be normally consumed again through a processing of inserting another component.

Based on the aforementioned technology, the present invention may construct the media application capable of dynamically storing the currently reproduced audio data as a file through the replacement of the file storage component, and simultaneously outputting the video data on the screen and transmitting the video data through a network by adding a component for dynamically copying the video data outputted on the screen and a network transmission component. Such a process may be progressed in a light weight state and the consumption of additional resources is not required.

The implementation method of the multimedia framework of the present invention is not limited to the aforementioned embodiment, and may be variously modified and implemented within the scope of the technical spirit of the present invention.

The invention claimed is:

1. A method of a processor processing multimedia data by a multimedia framework, which allows a media application to omit checking of a construction of a media graph, the method comprising the steps of:
   (a) receiving, by the processor, information on a component and connection information on the component required for the construction of the media graph from the media application; and
   (b) ensuring, by the processor, that the media graph is constructed according to contents received in the step of (a) and that the multimedia framework is ready to execute a rendering command without checking the construction of the media graph,
   wherein the component includes a connection denial incapability component which is incapable of denying a connection, and
   wherein the connection denial incapability component pre-stores alignment unit information on data processible by the connection denial incapability component, and compares, by the processor, the pre-stored alignment unit information with alignment unit information included in a header of the input data, and receives, by the processor, the data when the pre-stored alignment unit information corresponds to the alignment unit information included in the header of the input data, but denies the reception of the data and makes the data flow, by the processor, when the pre-stored alignment unit information does not correspond to the alignment unit information included in the header of the input data.

2. The method as claimed in claim 1, wherein in the step of (a), the information on the component and the connection information on the component are directly received by the processor.

3. The method as claimed in claim 1, wherein in the step of (a), the information on the component and the connection information on the component are received by the processor through preset file information containing the information on the component and the connection information on the component.

4. The method as claimed in claim 1, wherein one or more components included in the media graph are allowed to be changed or replaced during the performance of the rendering command.

5. The method as claimed in claim 1, wherein the connection denial incapability component outputs the data by adding alignment unit information on the corresponding data to a header of the data processed by itself.

6. The method as claimed in claim 1, wherein the connection denial incapability component outputs the data by adding type information and alignment unit information on the corresponding data to a header of the data, pre-stores the type information and the alignment unit information on the data processible by itself, and receives the data when all of the type information and the alignment unit information included in the header of the input data correspond to the pre-stored type information and the pre-stored alignment unit information, but denies the reception of the data and makes the data flow when any one of the type information and the alignment unit information included in the header of the input data does not correspond to the pre-stored type information and alignment unit information.

7. The method as claimed in claim 1, wherein the flown data is transferred to the multimedia framework or another component designated by the multimedia framework.

8. The method as claimed in claim 7, wherein when the multimedia framework receives the flown data, the multimedia framework notifies the media application of the fact that the multimedia framework receives the flown data.

9. The method as claimed in claim 1, wherein one or more components included in the media graph are allowed to be changed or replaced during the performance of the rendering command.

10. A non-transitory computer readable recording medium including a program executing the method of one as claimed in claim 1.

11. The method as claimed in claim 1, further comprising flowing the multimedia data from the connection denial incapability component into the multimedia framework in response to the connection denial incapability component being incapable of processing the multimedia data.

* * * * *